United States Patent [19]
Zuech

[11] 3,726,939
[45] Apr. 10, 1973

[54] DIMERIZATION OF OLEFINS WITH CHROMIUM HALIDE COMPLEX CATALYSTS SYSTEMS

[75] Inventor: Ernest A. Zuech, Bartlesville, Okla.

[73] Assignee: Phillips Petroleum Company, Bartlesville, Okla.

[22] Filed: Mar. 29, 1971

[21] Appl. No.: 129,226

Related U.S. Application Data

[60] Division of Ser. No. 778,307, Nov. 22, 1968, Pat. No. 3,627,700, which is a continuation-in-part of Ser. Nos. 635,649, May 3, 1967, abandoned, and Ser. No. 635,700, May 3, 1967, abandoned.

[52] U.S. Cl. ................260/683.15 D, 260/666 A
[51] Int. Cl. ............................................C07c 3/10
[58] Field of Search ............260/683.15 D, 666 A

[56] References Cited

UNITED STATES PATENTS

| | | | |
|---|---|---|---|
| 3,081,287 | 3/1963 | Coover et al. | 260/93.7 |
| 3,008,943 | 11/1961 | Guyer | 260/93.7 |
| 3,318,860 | 5/1967 | Eichenbaum | 260/93.7 |
| 3,379,706 | 4/1968 | Wilke | 260/683.15 X |

*Primary Examiner*—Paul M. Coughlan, Jr.
*Attorney*—Young and Quigg

[57] ABSTRACT

Olefins are dimerized by contacting the olefin with a homogeneous catalyst comprising a chromium halide complex in combination with an ethylaluminum dichloride adjuvant. Additionally, a heterogeneous catalyst is prepared by depositing upon a suitable support the homogeneous combination mentioned above and contacting the olefin to produce dimers thereof.

11 Claims, No Drawings

DIMERIZATION OF OLEFINS WITH CHROMIUM HALIDE COMPLEX CATALYSTS SYSTEMS

This application is a divisional of application Ser. No. 778,307, filed Nov. 22, 1968, now U.S. Pat. No. 3,627,700 which is a continuation-in-part of copending applications Ser. No. 635,649, filed May 3, 1967, now abandoned, and Ser. No. 635,700, filed May 3, 1967, now abandoned.

FIELD OF THE INVENTION

This invention relates to the conversion of olefin hydrocarbons and a homogeneous catalyst for such conversion. In another aspect, this invention relates to the conversion of olefin hydrocarbons by contacting the olefin with a catalyst which has been deposited upon a suitable support. In another aspect, the invention relates to the conversion of olefins to dimers by contacting the olefin with a homogeneous chromium halide complex-ethylaluminum dichloride adjuvant catalyst system, or with a heterogeneous catalyst system prepared by depositing upon a suitable support material the homogeneous chromium halide complex-ethylaluminum dichloride catalyst. In still another aspect, it relates to new homogeneous and heterogeneous multi-component catalysts active for dimerizing olefins.

DESCRIPTION OF THE PRIOR ART

A number of systems have been recorded in the prior art in which certain transition metal salts or complexes have been found to be useful in forming catalysts for the dimerization and oligomerization of olefins. In particular, a great number of nickel complexes have been found useful for this purpose, particularly when used with an organoaluminum adjuvant. It has now been found, however, that certain chromium complexes can be used to form catalyst systems having high activity and selectivity for olefin dimerization.

OBJECTS OF THE INVENTION

It is an object of this invention to provide a method and a catalyst for the conversion of olefin hydrocarbons to dimers thereof. It is also an object of this invention to provide a homogeneous catalyst for dimerizing olefins. It is still another object of the invention to provide a heterogeneous catalyst for dimerizing olefins. Other aspects, objects and advantages of the invention will be apparent to one skilled in the art upon reading the summary of the invention, the description of the preferred embodiments, and the claims.

SUMMARY OF THE INVENTION

The method of the invention comprises contacting acyclic or cyclic olefins, or mixtures thereof, with a catalyst system resulting from the admixture of (a) a chromium halide complex represented by the formula $(L_1)_2(NO)_2CrX_2$, $(L_1)_2CrX_2$, $(L_2)_3CrX_3$, or $[(L_3)_2CrX_3]_2$ wherein X is chlorine, bromine, iodine, or fluorine and $(L_1)$, $(L_2)$, and $(L_3)$ are selected pyridine, pyridine oxide, phosphine, or phosphine oxide ligands, and the total number of carbon atoms in the chromium halide complex does not exceed about 50, and (b) ethylaluminum dichloride (EADC), to produce dimers of the olefins which are contacted with the catalyst. The invention also contemplates the catalysts which are formed from admixture of the chromium halide complexes and ethylaluminum dichloride in either a homogeneous or heterogeneous system. When the heterogeneous system is employed, the catalyst system compriss the chromium halide complex-EADC which is deposited upon a suitable support.

The $(L_1)$ ligands which are applicable in the chromium halide complexes of the catalyst system of the present invention are selected from:

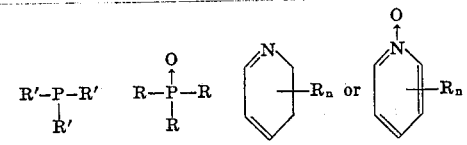

The $(L_2)$ ligands which are applicable are represented by:

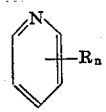

The $(L_3)$ ligands which are applicable are represented by:

wherein R is an aromatic or saturated aliphatic hydrocarbon radical having up to 20 carbon atoms, R' is a saturated aliphatic hydrocarbon radical having up to 20 carbon atoms, and n is a whole number from 0 to 4, inclusive, and wherein the total number of carbon atoms in the chromium complex does not exceed about 50.

DESCRIPTION OF THE PREFERRED EMBODIMENTS

Examples of chromium complexes of the type $(L_1)_2(NO)_2CrX_2$ are:
 bis(tributylphosphine)dinitrosyldichlorochromium
 bis(tricyclopentylphosphine)dinitrosyldiiodochromium
 bis(triphenylphosphine oxide)dinitrosyldichlorochromium
 bis(tributylphosphine oxide)dinitrosyldichlorochromium
 bis(tricyclopentylphosphine oxide)dinitrosyldibromochromium
 bis(tribenzylphosphine oxide)dinitrosyldiiodochromium
 bis(tri-o-tolylphosphine oxide)dinitrosyldifluorochromium
 bis(pyridine)dinitrosyldichlorochromium
 bis(4-methylpyridine)dinitrosyldibromochromium
 bis(2-methyl-4-isobutylpyridine)dinitrosyldiiodochromium
 bis(4-phenylpyridine)dinitrosyldifluorochromium
 bis(4-eicosylpyridine)dinitrosyldichlorochromium
 bis(pyridine oxide)dinitrosyldichlorochromium
 bis(4-cyclohexylpyridine oxide)dinitrosyldibromochromium
 bis(2,3-dimethyl-4,5-diethylpyridine oxide)dinitrosyldiiodochromium
 and the like and mixtures thereof.

Examples of chromium complexes of the type $(L_1)_2CrX_2$ are:
bis(tributylphosphine)dichlorochromium
bis(tridecylphosphine)dibromochromium
bis(triphenylphosphine oxide)dichlorochromium
bis(4-ethylpyridine)dichlorochromium
bis(tridecylphosphine oxide)dibromochromium
bis(triethylphosphine oxide)diiodochromium
bis(tribenzylphosphine oxide)difluorochromium
bis(pyridine)dichlorochromium
bis(3,5-dimethylpyridine)dichlorochromium
bis(4-phenylpyridine)dibromochromium
bis(4-dodecylpyridine oxide)dibromochromium
bis(3-methyl-4-cyclohexylpyridine oxide)difluorochromium
and the like and mixtures thereof.

Examples of $(L_2)_3CrX_3$ chromium complexes are:
tris(pyridine)trichlorochromium
tris(4-ethylpyridine)trichlorochromium
tris(pyridine)tribromochromium
tris(2,3,4-trimethylpyridine)triiodochromium
tris(4-eicosylpyridine)trifluorochromium
tris(4-benzyl-5-methylpyridine)trichlorochromium
tris(3-cycloheptylpyridine)trichlorochromium
tris(4o-tolylpyridine)tribromochromium
tris(3-isobutylpyridine)trichlorochromium
and the like and mixtures thereof.

Examples of $[(L_3)_2CrX_3]_2$ chromium complexes are:
[bis(tributylphosphine)trichlorochromium]$_2$
[bis(trimethylphosphine)triiodochromium]$_2$
[bis(tricyclohexylphosphine)tribromochromium]$_2$
[bis(trieicosylphosphine)trichlorochromium]$_2$
[bis(tridecylphosphine)trichlorochromium]$_2$
[bis(tricyclobutylphosphine)trifluorochromium]$_2$
[bis(tri-sec-butylphosphine)trichlorochromium]$_2$
and the like and mixtures thereof.

Among the olefins which are dimerized according to the present process are acyclic and cyclic monoolefins having up to about 12 carbon atoms per molecule, and mixtures thereof. The acyclic monoolefin can contain terminal or internal unsaturation, and be branched or unbranched. The lower acyclic terminal olefins are generally preferred and the process of the invention is particularly effective for the dimerization of ethylene and propylene, and the co-dimerization of ethylene and propylene.

The chromium halide complexes described above can be prepared by any suitable method. For example, the chromium halide complex can be formed by contacting a chromium halide, such as $CrCl_3$, with an applicable phosphine, phosphine oxide, pyridine, pyridine oxide, nitric oxide, or a nitrosyl halide corresponding to the ligands described above under conditions of time and temperature which are sufficient to permit the complex to be formed. In such a preparation, the molar proportion of the chromium halide salt to the coordinating compounds will correspond, approximately, to the stoichiometry indicated in the formulas of the chromium complexes listed above. Nitric oxide, however, can be, and generally is, present in substantial excess. These ingredients are generally mixed at a temperature in the range of from about 0° to about 130° C, preferably 20° to about 60° C, for a time in the range of from a few seconds up to about 24 hours, preferably in the presence of a diluent in which the components of the reaction are at least partially soluble. Any convenient diluent such as methylene chloride, benzene, chlorobenzene, and the like, can be used for this purpose.

The chromium halide complex of the catalyst system is prepared before contact is made with the ethylaluminum dichloride. It is sometimes desirable to remove excess or unreacted NO or nitrosyl halides from the chromium halide complex, if they are present, before contact is made with the aluminum component. Such removal can be conveniently carried out by warming the complex under reduced pressure to evaporate the NO or nitrosyl halide. Such removal of this excess reagent is not a necessity but is frequently desirable, because the excess reagent appears to consume some of the aluminum component which is added later. For this same reason, grossly excessive amounts of any of the complexing agents should be avoided.

The chromium halide complex and aluminum components of the catalyst invention are generally combined, to prepare the active catalyst, in proportions in the range of from about 0.1:1 to about 20:1, preferably from about 1:1 to about 10:1, moles of the aluminum component to moles of the chromium component. The catalyst is prepared simply by combining these components under conditions of time and temperature which permit the catalytically active catalyst to be formed. This combination occurs very readily, and, in general, the components can be mixed at any convenient temperature within the range of $-80°$ to about 100° C for a few seconds or for periods up to several hours in the presence of a diluent in which both the components are at least partially soluble. Any convenient diluent such as chlorobenzene, methylene chloride, ethylene chloride, benzene, xylene, toluene, cyclohexane, and the like can be used for this purpose. Halogenated diluents are generally preferred. The mixing of these two catalyst components is generally carried out in the substantial absence of air or moisture, generally in an inert atmosphere. After the catalytic mixture is formed, it need not be isolated but can be added directly to the reaction zone as a solution in its preparation solvent. If desired, the two catalyst components can be separately added, in any order, to the reaction zone either in the presence or absence of the feed olefin.

The dimerization of the olefin or mixture of olefins can take place at temperatures within the range of from about 10° to about 80° C, preferably within the range of from about 30° to about 70° C. Normally, it is desirable to carry out the dimerization reaction under pressures ranging up to about 2,000 psig, and preferably 20–750 psig. The dimerization can be carried out in the presence of a diluent such as that used for the catalyst preparation if desired. The time of contact of the olefin with the catalyst for the dimerization of the olefin will vary depending upon the desired degree of conversion, but generally will be in the range of from about 0.1 minute to about 20 hours, preferably 5 to 120 minutes. The proportion of catalyst composition to olefin feed in the reaction zone will generally be within the range of from about 0.001 to about 0.1 mole of chromium complex per mole of olefin feed.

Any suitable contacting technique can be utilized for the olefin dimerization and batchwise or continuous operation can be utilized. After the desired degree of conversion of the olefin to the dimer, the products so formed can be separated and isolated by conventional means such as by fractionation, crystallization, adsorption, and the like. The unconverted feed material can be recycled through the reaction zone. If desired, the catalyst can be deactivated by treatment with suitable deactivating agents such as water or alcohol, prior to the separation of the products.

The homogeneous catalysts of this invention can be deposited upon a suitable support or carrier and used in the dimerization reaction. Preferably, but not limited to, the olefin feed is in the vapor phase when contacted with the heterogeneous catalyst. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyldimethylphosphine, and the like.

The support can be impreganted with the homogeneous catalyst by wetting the support with a solution of the catalyst in a solvent which is then evaporated. The support can also be impregnated with either the chromium or aluminum component and the remaining component can be added later. For example, the solid support material can be impregnated with the chromium component and the resulting composite conveniently stored until required. Just prior to use, the composite can be treated with the aluminum component, or, if the reaction is in the liquid phase, the aluminum component can simply be added to the reaction zone. Among solvents suitable are relatively low-boiling organic solvents such as pentane, methylene chloride, cyclohexane, and the like. The amount of homogeneous catalyst added to the support will be from 0.1 to about 30 weight percent of the total of the catalyst and support. If the support is to be activated by calcination, it is activated prior to the impregnation step.

Impregnation and evaporation conditions in preparing the catalyst are conventional, being carried out at temperatures up to about 150°C. Operating conditions in carrying out the dimerization are the same for the supported and the non-supported homogeneous catalyst systems.

The dimerization of olefins, and the dimers so produced, can be used for many purposes well known in the art. For example, propylene dimers can be cracked by conventional methods to make isoprene. Propylene dimers, as well as dimers of other olefins, can be employed as feedstock for the oxo-process to make oxo alcohols which are used in the preparation of plasticizers. The present dimerization process can also be used very effectively in conjunction with olefin disproportionation processes. For example, when propylene is disproportionated to produce ethylene and butenes, ethylene can be dimerized to produce additional butenes.

It is understood that the foregoing discussion of the readtion of the suitable olefin feed material with the catalyst is not limited to the preparation of dimers, although the reaction product produced under the conditions as discussed previously contains substantial amounts of olefin dimers. The reaction product also comprises other oligomers of the olefin feed material. By oligomers, it is meant the trimers, tetramers, and the like of the olefin feed material.

EXAMPLES

A number of olefin dimerization runs were carried out using several different catalyst systems. The conversions were carried out batchwise in a 300 ml autoclave. The catalyst preparation procedure was as follows. A stoppered bottle was dried and flushed with nitrogen. The chromium complex was added first followed by 100 to 150 ml of chlorobenzene diluent and then the ethylaluminum dichloride was added. This solution was then transferred to the autoclave which was similarly dried and flushed with nitrogen. The feed olefin was then admitted to the autoclave at the prescribed pressure. Table I gives the data and the results of the runs utilizing different catalyst systems and different conditions.

TABLE I

| Feed | Cr complex | Milli-moles | EADC, ml. | Temp., °C. | P, p.s.i.g. | Time, hr. | Dimers, g. | Selectivity, percent |
|---|---|---|---|---|---|---|---|---|
| $C_2^=$ | $(Py)_3CrCl_3$ | 0.1 | 0.5 | 17 | 750 | 1 | 20.5 | 82 |
| $C_2^=$ | $(Py)_3CrCl_3$ | 0.1 | 0.5 | 50 | 750 | 1 | 50.7 | 83 |
| $C_2^=$ | $(Py)_3CrCl_3$ | 0.1 | 0.5 | 75 | 500 | 1 | 38 | 60 |
| $C_2^=$ [5] | $(Py)_3CrCl_3$ | 0.1 | 0.5 | 50 | 500 | 1 | t | ---- |
| $C_2^=$ | $[(Bu_3P)_2CrCl_3]_2$ | 0.1 | 0.5 | 50 | 500 | 1 | 51 | 83 |
| $C_2^=$ | $(4\text{-}EtPy)_3CrCl_3$ | 0.1 | 0.5 | 50 | 500 | 1 | 49 | 89 |
| $C_2^=$ | $(4\text{-}EtPy)_3CrCl_3$ | 0.05 | 0.25 | 50 | 500 | 1 | 63 | 81 |
| $C_2^=$ | $(4\text{-}EtPy)_3CrCl_3$ | 0.025 | 0.125 | 50 | 500 | 1 | 59 | 85 |
| $C_2^=$ | $(4\text{-}EtPy)_3CrCl_3$ | 0.05 | 0.5 | 50 | 500 | 1 | 56 | 78 |
| $C_2^=$ | $(4\text{-}EtPy)_2(NO)_2CrCl_2$ | 0.05 | 0.5 | 50 | 500 | 1 | 59 | 79 |
| $C_2^=$ | $(Ph_3PO)_2(NO)_2CrCl_2$ | 0.05 | 0.5 | 50 | 500 | 1 | 57 | 82 |
| $C_3^=$ | $(Py)_3CrCl_3$ | 0.1 | 0.5 | 50 | 100 | 1.5 | 17.3 | ~58 |
| $C_3^=$ | $(4\text{-}EtPy)_3CrCl_3$ | 0.05 | 0.25 | 50 | 120 | 1.5 | [1] 42 | ~67 |
| $C_2^=/C_3^=$ [2] | $(4\text{-}EtPy)_3CrCl_3$ | 0.05 | 0.5 | 50 | 600 | 2 | [3] [4] | ---- |

[1] Hydrogenation of the hexenes yielded 31% n-hexane, 69% 2-methylpentane, and a trace of 3-methylpentane.
[2] 59 g. $C_3^=$ present at beginning of run.
[3] 22.6 g. $C_4^=$'s, 10.4 g. $C_5^=$'s, 5.9 g. $C_6^=$'s, 1.5 g. $C_7^=$'s, 0.8 g. $C_8^=$'s, 1.0 higher.
[4] Further analysis of the pentenes showed 65.8% t-2-pentene, 23.4% c-2-pentene, 5.4% 3-methyl-1-butene, 4.8% 1-pentene, 0.6% 2-methyl-2-butene, and traces of 2-methyl-1-butene.
[5] Used MASC in place of EADC.

Other methods of contacting the olefin with the catalyst of the invention will be within the knowledge of those skilled in the art. Accordingly, the disclosure of the invention wherein acyclic or cyclic olefins are dimerized by contacting with a catalyst formed on admixture of (a) $(L_1)_2(NO)_2CrX_2$, $(L_1)_2CrX_2$, $(L_2)_3CrX_3$, or $[(L_3)_2CrX_3]_2$ wherein X is chlorine, bromine, or iodine, and $(L_1)$, $(L_2)$, and $(L_3)$ are selected pyridine, pyridine oxide, phosphine or phosphine oxide ligands, and the total number of carbon atoms in the chromium halide complex does not exceed about 50, and (b) ethylaluminum dichloride in a homogeneous system or by contacting the olefin in the presence of a catalyst formed on admixture of (a) and (b) which has been deposited upon a suitable support to provide a heterogeneous system will enable those skilled in the art to make certain modifications within the scope of the invention.

I claim:

1. A method of producing a reaction product which comprises olefin dimers, the method comprising reacting olefins selected from acyclic monoolefins and cyclic monoolefins, having from two to about 12 carbon atoms or mixtures thereof with a catalyst comprising (a) a chromium halide complex represented by the formula $(L_1)_2(NO)_2CrX_2$ or $(L_2)_3CrX_3$, wherein X is chlorine, bromine, iodine or fluorine, and $(L_1)$ and $(L_2)$ are ligands, the $(L_1)$ ligand is represented by the formulas

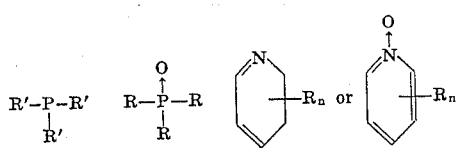

the $(L_2)$ ligands are represented by the formula

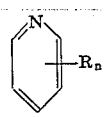

wherein R is an aromatic or saturated aliphatic hydrocarbon radical having up to 20 carbon atoms, R' is a saturated aliphatic hydrocarbon radical having up to 20 carbon atoms, $n$ is a whole number from 0 to 4, inclusive, and the total number of carbon atoms in the chromium halide complex does not exceed about 50, and (b) ethylaluminum dichloride.

2. A method according to claim 1 wherein the chromium halide complex is $(L_1)_2(NO)_2CrX_2$.

3. A method according to claim 2 wherein the (a) component of the catalyst is bis(triphenylphosphine oxide)dinitrosyldichlorochromium or bis(4-ethylpyridine)dinitrosyldichlorochromium.

4. A method according to claim 1 wherein the chromium halide complex is $(L_2)_3CrX_3$.

5. A method according to claim 4 wherein the (a) component of the catalyst is tris(pyridine)trichlorochromium or tris(4-ethylpyridine)trichlorochromium.

6. The method of claim 1 wherein the olefin is contacted with the catalyst at a temperature of 10° to 80° C.

7. The method according to claim 1 wherein the catalyst is deposited upon a suitable support.

8. A method according to claim 1 wherein the olefin is ethylene, propylene, or a mixture of ethylene and propylene.

9. A method of producing a reaction product which comprises olefin dimers, the method comprising reacting olefins selected from acyclic monoolefins and cyclic monoolefins, having from two to about 12 carbon atoms or mixtures thereof with a catalyst comprising (a) a chromium halide complex represented by the formula $(L_1)_2CrX_2$, wherein X is chlorine, bromine, iodine or fluorine, and $(L_1)$ is represented by the formulas

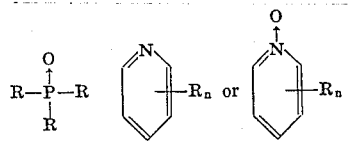

wherein R is an aromatic or saturated aliphatic hydrocarbon radical having up to 20 carbon atoms, $n$ is a whole number from 0 to 4, inclusive, and the total number of carbon atoms in the chromium halide complex does not exceed about 50, and (b) ethylaluminum dichloride.

10. A method according to claim 9 wherein the chromium halide complex is $(L_1)_2CrX_2$.

11. A method according to claim 9 wherein the (a) component of the catalyst is bis(4-ethylpyridine)dichlorochromium.

* * * * *